(12) United States Patent
Svenningsson et al.

(10) Patent No.: US 6,200,077 B1
(45) Date of Patent: Mar. 13, 2001

(54) TWIST DRILL HAVING MULTIPLE FLANK SURFACES FOR EACH CUTTING EDGE

(75) Inventors: Inge Svenningsson; Åke Sjolander, both of Sandviken (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/372,608

(22) Filed: Aug. 12, 1999

(30) Foreign Application Priority Data

Aug. 13, 1998 (SE) .................................................. 9802718

(51) Int. Cl.[7] .................................................. B23B 51/02
(52) U.S. Cl. .................... 408/230; 407/113; 408/227; 408/233; 408/713
(58) Field of Search ...................... 408/199, 224, 408/227, 230, 233, 713; 407/113–115

(56) References Cited

U.S. PATENT DOCUMENTS

| 3,460,409 | * | 8/1969 | Stokey | 407/115 |
| 5,049,011 | * | 9/1991 | Bohnet et al. | 408/713 |
| 5,478,179 | * | 12/1995 | Kress et al. | 408/227 |
| 5,688,083 | * | 11/1997 | Boianjiu | 408/713 |

OTHER PUBLICATIONS

Weck, M. and Teipel, K., "Dymanisches Verhalten spanander Werkzeugmaschinen", Springer–Verlag 1977, ISBN 3–540–08468–1.

* cited by examiner

*Primary Examiner*—Steven C. Bishop
(74) *Attorney, Agent, or Firm*—Burns, Doane, Swecker & Mathis, L.L.P.

(57) ABSTRACT

A twist drill includes a shank which defines a longitudinal center axis and has a helical, chip-transporting flute formed therein. A cutting insert is arranged at a front end of the flute. The insert includes a body forming a cutting edge and a flank surface arrangement situated behind the cutting edge. The flank surface arrangement includes first and second flank surfaces extending at respective first and second acute angles relative to a reference plane which contains the center axis. The sizes of the first and second acute angles are different from one another. In one embodiment, each of the first and second flank surfaces intersects the cutting edge. In a second embodiment, only the second flank surface intersects the cutting edge, with the first flank surface extending from a rear end of the second flank surface.

17 Claims, 4 Drawing Sheets

TWIST DRILL HAVING MULTIPLE FLANK SURFACES FOR EACH CUTTING EDGE

TECHNICAL FIELD OF THE INVENTION

This invention relates to a twist drill of the type that comprises a shank having one or more helical, chip-transporting grooves, each one of which cooperates with at least one cutting insert having a cutting edge located between a front surface and a flank surface, the flank surface extending at an angle to a reference plane intersecting the center axis of the drill shank.

BACKGROUND OF THE INVENTION

Generally, twist drills tend to oscillate in the direction of torsion during machining. When the drill is in operation, the shank oscillates to and fro in the direction of torsion, whereby the axial position of the cutting edges is alternately moved forward and backward relative to the workpiece. Thus, the effective drill length is alternately extended and shortened during the oscillation. This cycle creates a regenerative effect in the form of a feed-back vibration phenomenon, which briefly may be described in the following way.

When a drill shank oscillates in the above-indicated way, the individual cutting edge cuts a wavy surface in the bottom of the bore hole, as is generally illustrated in FIGS. 3 and 4. Thereafter, when either one and the same cutting edge or a subsequent cutting edge (depending on whether the tool includes one or more cutting edges which cut in the same path) runs across this wavy surface, a secondary wavy surface is created (compare the continuous and dashed wave lines, respectively, in FIG. 4). In practice, this means that the nominal chip thickness will vary depending on the phase position or phase displacement between the wavy surfaces in the bottom of the bore hole. When this nominal chip thickness varies, the cutting force will also vary. This constitutes the driving force behind the above-mentioned vibration mechanism. If the chip width is increased, due to the fact that the diameter of the drill is increased at the same time as the other properties of the drill remain intact beyond a certain value, the mechanical system is no longer capable of resisting, and therefore the oscillating amplitude will grow and become unstable. By "mechanical system" is here meant primarily the helically cut drill as such. This mechanical system is primarily effected by the length of the drill shank. More precisely, a longer drill becomes more unstable in the torsion direction than a shorter one.

If the regenerative effect is triggered off, i.e. the amplitude of the vibrations grows, after a short while the vibration level will be very high. However, the growth of the amplitude decreases after a time as a consequence of other mechanisms, for instance the fact that the cutting edge cannot cut itself free.

OBJECTS AND FEATURES OF THE INVENTION

The present invention aims at solving the above mentioned problems and at providing an improved twist drill. Thus, a primary object is to provide a twist drill which directly at the beginning of use counteracts the development of an unstable regenerative effect, i.e. counteracts a tendency for increasing oscillating amplitude to occur in the drill shank when the drill operates.

According to the invention, the above-mentioned object is attained by a twist drill which comprises a shank that defines an axis of rotation and has a helical, chip-transporting flute. The drill further includes a cutting part arranged at a front end of the flute. The cutting part includes a body which forms a cutting edge, and a clearance surface arrangement which is situated behind the cutting edge with reference to a direction of drill rotation. The clearance surface arrangement includes first and second clearance surfaces each extending at respective first and second acute angles relative to a reference plane containing the axis of rotation. The sizes of the first and second acute angles are different from one another.

In one embodiment of the invention, both of the first and second clearance surfaces intersect the cutting edge, and one of the first and second clearance surfaces constitutes a recessed clearance surface that is recessed into the body relative to the other of the first and second clearance surfaces.

In another embodiment of the invention, only the second clearance surface intersects the cutting edge, and the first clearance surface extends from an end of the second clearance surface that is remote from the cutting edge.

BRIEF DESCRIPTION OF THE DRAWINGS

The objects and advantages of the invention will become apparent from the following detailed description of preferred embodiments thereof, in connection with the accompanying drawings, in which like numerals designate like elements, and in which.

DETAILED DESCRIPTION OF PREFERRED EMBODIMENTS OF THE INVENTION

Figure 1:
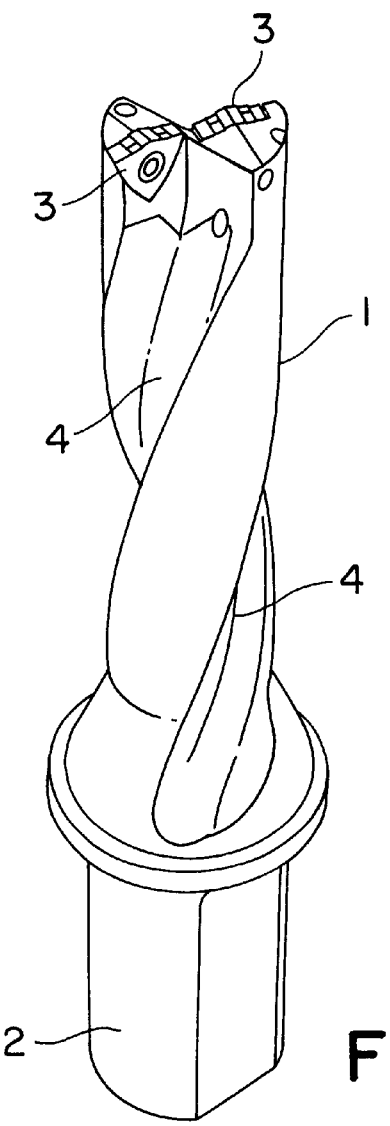
FIG. 1 is a perspective view of a twist drill having two cutting inserts according to the principle of the invention.

It should be initially pointed out that the twist drill shown in FIG. 1 includes two cutting inserts which cooperate with a corresponding number of chip-transporting flutes in the shank. Although these flutes are helicoidal and not strictly helical, the type of tools in question are called twist drills by those skilled in the art. Henceforth, the chip-transporting grooves or flutes or grooves will thus be described as helical, although in a geometric sense they are helicoidal.

It should also be pointed out that the number of flutes may deviate front two and that more than one cutting insert may cooperate with each individual flute.

The drill tool shown in FIG. 1 includes a shank 1, which at a rear end thereof transforms into an attachment part 2 having a shape which is suitable for attachment of the tool in a conventional holder. The shank has two cutting inserts at the front end or tip thereof which, in the example shown, comprise detachable, indexible cutting inserts 3. More precisely, the inserts may be fastened by means of screws in seats in the area of the tip of the shank. In the example, a number of flutes 4 corresponding to the number of cutting inserts, extend backwards from the tip of the shank. These flutes are helical and have the purpose of evacuating chips, which are loosened by the inserts 3, out of the drill hole.

Figure 2:
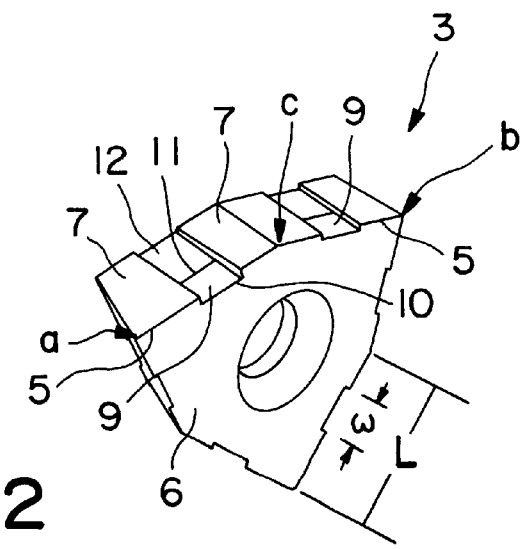
FIG. 2 is a perspective view of an individual cutting insert according to a first embodiment of the invention.

In FIG. 2 an individual cutting insert 3 is illustrated on an enlarged scale. In this embodiment, the insert has a hexagonal basic shape and three pairs of cooperating main cutting edges 5 that are active in pairs during operation. For example, one main cutting edge 5 of a cooperating pair extends from point a to point c in FIG. 2, and the other main cutting edge 5 of that cooperating pair extends from point b to point c. Thus, it can be seen that each cutting insert 3 may be readjusted (indexed) between three different operating positions in the appurtenant seat.

Each separate main cutting edge 5 is located between, on one hand, a front or top surface 6 of the insert and, on the other hand, a first flank surface 7 extending at an acute angle to the front surface 6 (or—if the front surface has a complex, uneven shape—at an acute angle to an arbitrary neutral plane which is generally parallel to the front surface). The front surface 6 is located in a reference plane C which contains the geometric center axis of the drill. According to existing standards, the angle β of the clearance surface 7 in relation to the reference plane C is acute and within the range of 78–84°.

Figure 5:
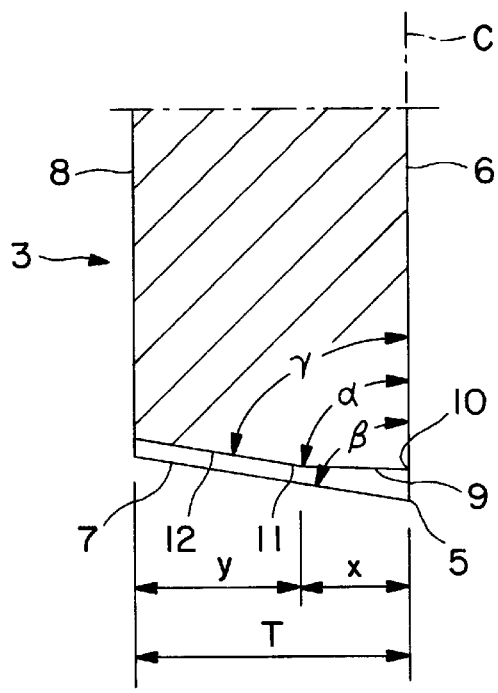
FIG. 5 is an enlarged partial section through a cutting edge of the cutting insert according to FIG. 2.
Figure 6:
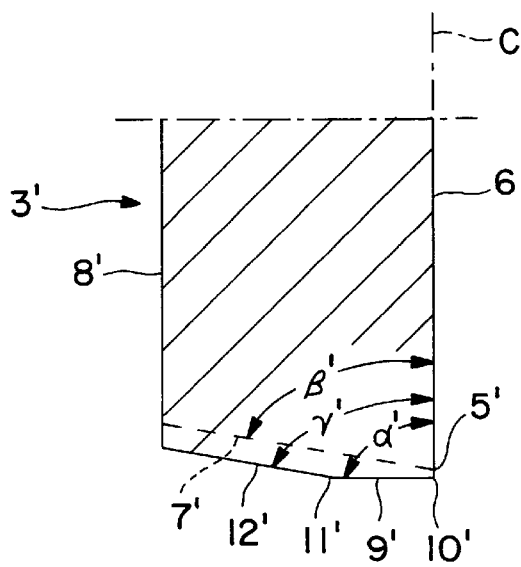
FIG. 6 is a view similar to FIG. 5 of a second embodiment of the invention.
Figure 7:
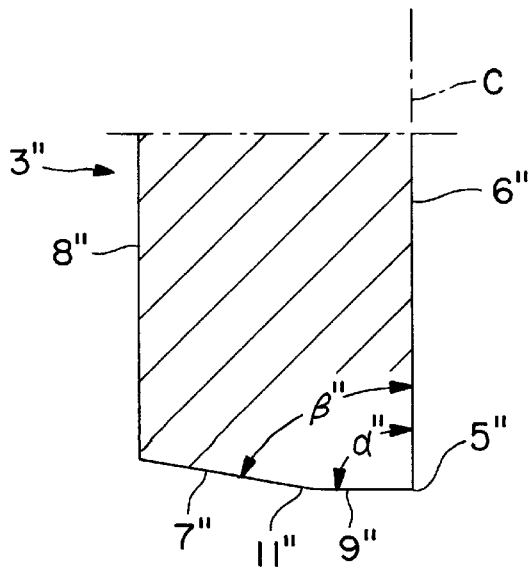
FIG. 7 is a view similar to FIG. 5 of a third embodiment of the invention.

An underside 8 of the insert is disposed opposite the front surface 6, as shown in FIGS. 5–7.

As thus far described, the drill and cutting inserts are in all essentials previously known.

New and characteristic for the present invention is that a second flank surface 9 is provided in connection with at least a part of each individual main cutting edge 5 of the cutting insert 3. The angle α of that surface 9 in relation to the reference plane C is acute and larger than the angle β of the first flank surface 7. Advantageously, in one embodiment, shown in FIG. 5, the angle α is in the range of 87–89°.

In the embodiment according to FIGS. 2 and 5 as well as in the alternative embodiment according to FIG. 6, the second flank surface 9 (or 9') extends only along a certain part of the length of the individual main cutting edge 5. In doing so, the flank surface 9 (or 9') connects to a secondary, shorter cutting edge or edge formation 10 (or 10'), which, in the embodiments according to FIGS. 5 and 6, is displaced (countersunk) depthwise in relation to the main cutting edge 5 which connects to the first flank surface 7 (or 7').

Figure 3:
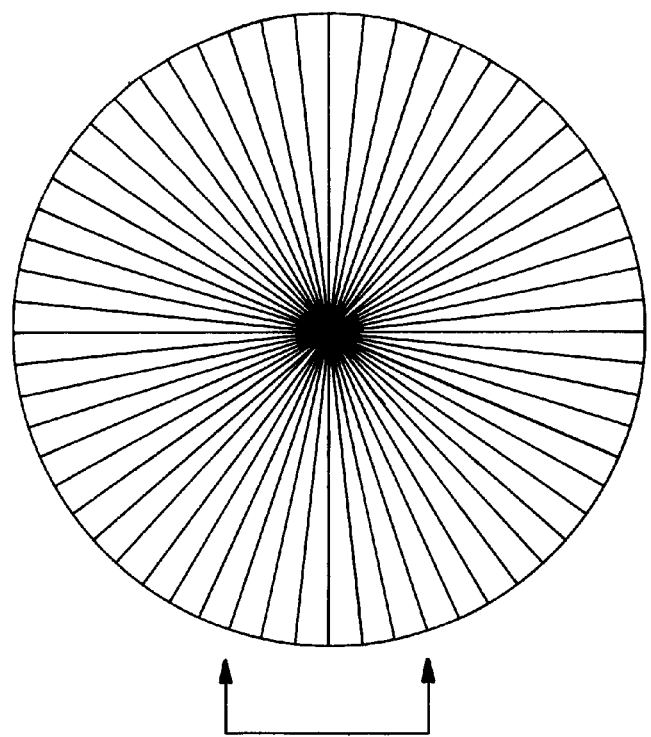
FIG. 3 is an enlarged planar view, which displays schematically a wavy form of the bottom of a bore hole obtained during use of conventional twist drills.
Figure 4:
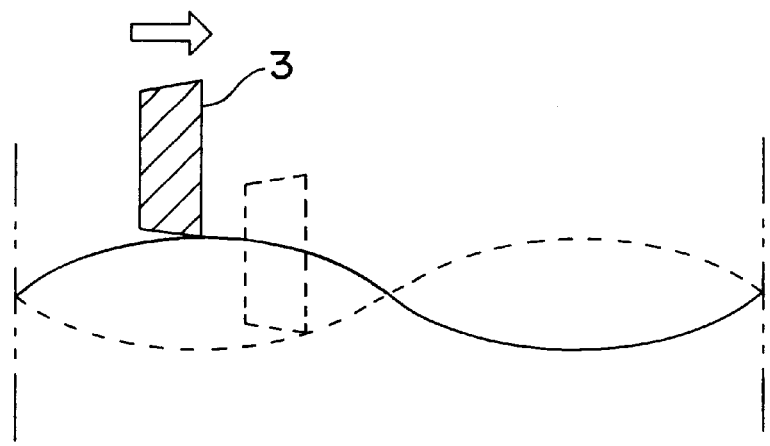
FIG. 4 is a partial section showing the conventional wavy form of the bore hole bottom of FIG. 3 on an extremely enlarged scale.

More precisely, in FIGS. 2 and 3, the flank surface 9 together with appurtenant secondary edge 10 are displaced a distance into the body, the surface 9 transforming, via a break line 11, into a third surface 12 which may be parallel to the flank surface 7, i.e. a third angle y formed by surface 12 with the reference plane C is equal to β. In practice, the length "x" of the surface 9 as measured in the direction of the thickness T of the insert should be less than the length "y" of the surface 12 measured in the same direction. It should also be pointed out that the countersink, which is delimited by the surfaces 9 and 12, should have a width w which is considerably less than the total width of the main flank surface 7. In other words, (L–w)>w in FIG. 2.

Figure 8:
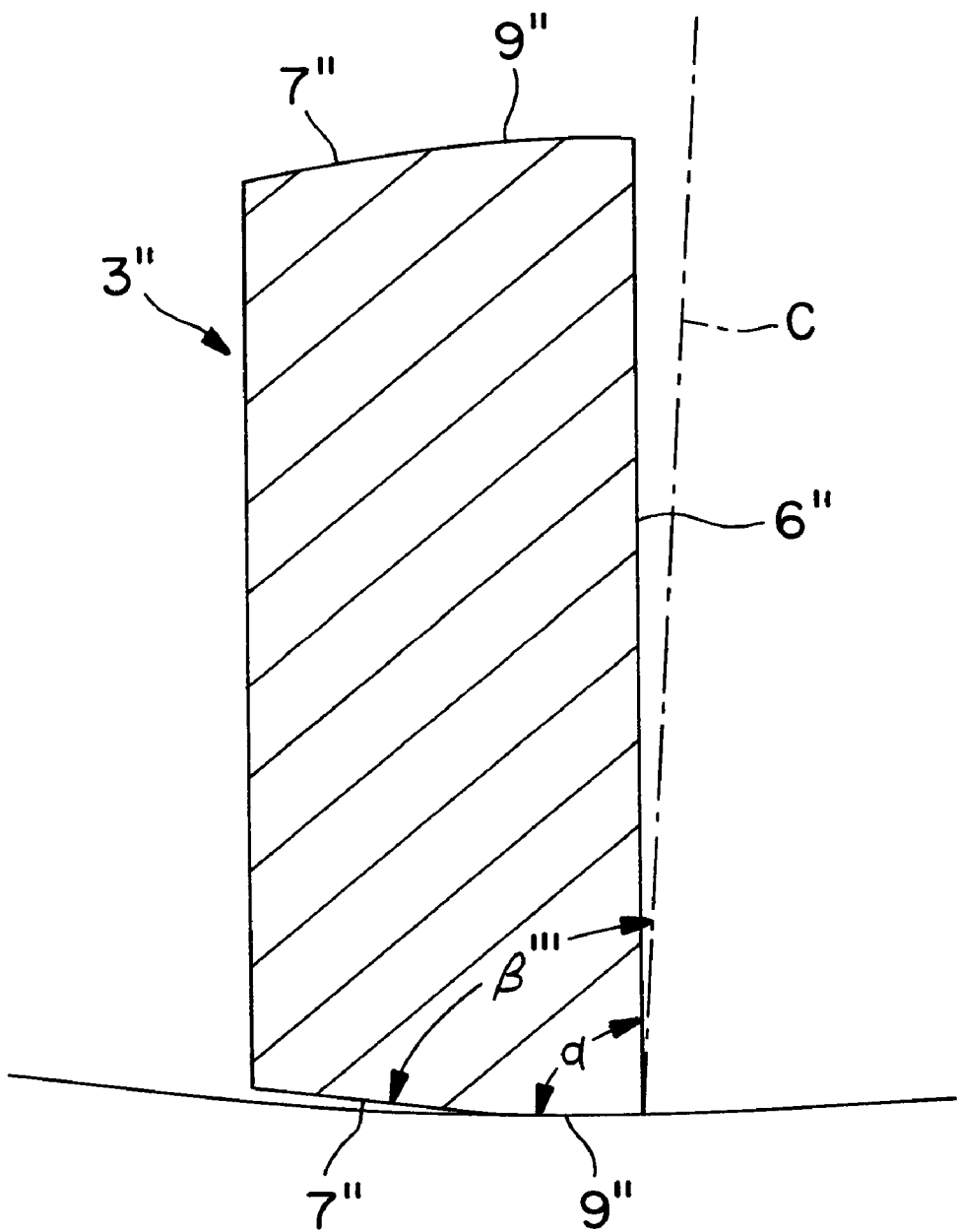
FIG. 8 is a view of the insert shown in FIG. 7 oriented obliquely relative to a reference plane containing a geometric center axis of the drill.

In FIGS. 6–8 are shown modified inserts 3' and 3" wherein the reference numerals that are used in FIGS. 2–5 are now provided with single-prime and double-prime symbols, respectively.

In the embodiment of a cutting insert 3' according to FIG. 6, the surfaces 9' and 12' are provided on a projection which protrudes somewhat in relation to the flank surface 7'. In other respects, the same dimensional and angular conditions as referred to above with respect to the embodiment according to FIG. 5 pertain also here.

In FIG. 7, a third embodiment is shown according to which the second, steeper flank surface 9" extends along the entire length of the cutting edge 5". Thus, in this embodiment, the second flank surface 9" transforms directly into the flank surface 7" via the break line 11". Thus, the countersinks and projections, respectively, of the type shown in FIGS. 5 and 6, are missing.

In FIG. 8 is illustrated how a cutting insert may be placed in an oblique position in relation to the reference plane C. While this can be done with any of the disclosed inserts, it is shown in connection with the insert 3" of of FIG. 7. The essential thing according to the invention is that the second flank surface 9" extends an acute angle in relation to said reference plane C which is different from the acute angle formed by the first flank surface with the reference plane C.

The Function and Advantages of the Invention

By forming the cutting insert in the above mentioned way, i.e., with not only a first planar flank surface 7, 7', 7", extending at, for instance, a 78–84° angle to the respective cutting edge, but also with a second flank surface 9, 9', 9" extending at a steeper angle to the front surface of the insert (e.g., 87–89°), it has turned out that the drill cannot oscillate with an amplitude higher than the amplitude the drill gets by cutting itself free, provided that the flank surface does not plasticize the material of the work piece. Such a plasticizing of the material dampens the oscillations by virtue of the work involved in the plasticizing process. Either the amplitude of the oscillations is limited or the oscillation frequency decreases below the frequency, which is natural for the tool, i.e. the neutral or inherent frequency of the tool. The amplitude with which the tool oscillates when the same cannot oscillate in the neutral frequency thereof but at a lower frequency will of necessity become lower by the fact that the oscillations in these frequencies are dampened faster. In order for the above-mentioned regenerative effect to be triggered off, i.e. the oscillating amplitude to grow, at a certain frequency, it is required that the transfer function of the system at this frequency, represented in the plane complex of numbers, should have a negative real part. At lower frequencies, the real part becomes positive.

If the drill tool cannot oscillate with higher frequencies, the regenerative effect cannot become unstable, i.e. triggered off (see Veck M Teipel K "Dynamisches Verhalten spanander Werkzeugmaschinen", Springer-Verlag 1977, ISBN 3-540-08468-1).

A substantial advantage of the present invention is that it enables the use of twist drills larger in length and/or diameter than previously known drills having corresponding performance. Thus, the manufacturer may choose between either extending the shank of the drill or providing the inserts with longer cutting edges (i.e. larger diameter) or more efficient cutting edges without the regenerative effect becoming unstable. Of course, an extension of the drill shank may also be combined with an increase of the diameter.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed:

1. A twist drill comprising a shank defining a longitudinal center axis and having a helical, chip-transporting flute formed therein, a cutting insert mounted at a front end of the flute, the cutting insert including a body forming a cutting edge and a flank surface arrangement situated behind the cutting edge with reference to a direction of drill rotation, the flank surface arrangement including first and second flank surfaces each extending at respective first and second acute angles relative to a reference plane containing the center axis, the sizes of the first and second acute angles being different from one another wherein both of the first and second flank surfaces intersect the cutting edge.

2. The twist drill according to claim 1 wherein one of the first and second flank surfaces forms a recessed flank surface that is recessed into the body relative to the other of the first and second flank surfaces.

3. The twist drill according to claim 2 wherein the second flank surface is at least part of the recessed flank surface, and the second acute angle being larger than the first acute angle.

4. The twist drill according to claim 3 wherein the second flank surface extends along less than an entire thickness of the body, a third surface extending from the second flank surface for a remainder of the thickness and forming a third acute angle with the reference plane which is smaller than the second acute angle.

5. The twist drill according to claim 4 wherein the first and third acute angles are equal.

6. The twist drill according to claim 4 wherein a length of the second flank surface as measured in a direction of the thickness of the body is shorter than a length of the third surface measured in the same direction.

7. The twist drill according to claim 3 wherein each of the first and second flank surfaces has a width extending along the cutting edge, a length of the cutting edge minus the width of the second flank surface being greater than the width of the second flank surface.

8. The twist drill according to claim 3 wherein the first acute angle is in the range 78–84°, and the second acute angle is in the range 87–89°.

9. The twist drill according to claim 2 wherein the first flank surface is at least part of the recessed flank surface, and the second acute angle is larger than the first acute angle.

10. The twist drill according to claim 8 wherein the second flank surface extends for less than an entire thickness of the body, a third surface extending from the second surface for a remainder of the thickness and forming a third a cute angle with the reference plane which is smaller than the second acute angle.

11. The twist drill according to claim 9 wherein the first and third acute angles are equal.

12. The twist drill according to claim 9 wherein a length of the second flank surface as measured in a direction of the thickness of the body is shorter than a length of the third surface measured in the same direction.

13. The twist drill according to claim 9 wherein the first acute angle is in the range 78–84°, and the second acute angle is in the range 87–89°.

14. The twist drill according to claim 1 wherein a third flank surface extends from an end of the second flank surface that is remote from the cutting edge.

15. The twist drill according to claim 14 wherein the first acute angle is in the range 78—84°, and the second acute angle is in the range 87–89°.

16. The twist drill according to claim 1 wherein the cutting insert includes a plurality of the cutting edges and is indexible.

17. The twist drill according to claim 16 wherein a plurality of the cutting inserts is mounted on the shank.

* * * * *